United States Patent
Nikulainen

(10) Patent No.: US 6,206,813 B1
(45) Date of Patent: Mar. 27, 2001

(54) ARRANGEMENT IN A VARIABLE-CROWN ROLL PROVIDED WITH LOADING SHOES

(75) Inventor: Osmo Nikulainen, Muurame (FI)

(73) Assignee: Valmet Corporation (FI)

( * ) Notice: Subject to any disclaimer, the term of this patent is extended or adjusted under 35 U.S.C. 154(b) by 0 days.

(21) Appl. No.: 09/380,099

(22) PCT Filed: Feb. 26, 1998

(86) PCT No.: PCT/FI98/00176

§ 371 Date: Aug. 26, 1999

§ 102(e) Date: Aug. 26, 1999

(87) PCT Pub. No.: WO98/38381

PCT Pub. Date: Sep. 3, 1998

(30) Foreign Application Priority Data

Feb. 28, 1997 (FI) .................................................. 970106 U

(51) Int. Cl.[7] .................................................. B23P 15/00
(52) U.S. Cl. .................................. 492/16; 492/7; 492/20
(58) Field of Search .................................. 492/16, 20, 7; 162/358.3, 272, 275

(56) References Cited

U.S. PATENT DOCUMENTS

| 4,856,154 | * | 8/1989 | Nikulainen et al. . | |
| 5,096,734 | * | 3/1992 | Nikulainen et al. | 427/8 |
| 5,170,547 | * | 12/1992 | Nikulainen et al. . | |
| 5,456,645 | | 10/1995 | Link | 492/16 |
| 5,846,173 | * | 12/1998 | Grabscheid et al. | 492/16 |
| 5,853,359 | * | 12/1998 | Grabscheid et al. | 492/20 |
| 5,896,813 | * | 4/1999 | Nikulainen et al. | 100/335 |
| 5,980,438 | * | 11/1999 | van Haag et al. | 492/7 |

FOREIGN PATENT DOCUMENTS 0340192  11/1989  (EP) .............................. D21G/1/02

OTHER PUBLICATIONS

PCT International Search Report (Form PCT/ISA/210), 3 pages.

PCT International Preliminary Examination Report (Form PCT/IPEA/409), 3 pages.

* cited by examiner

Primary Examiner—I Cuda Rosenbaum
(74) Attorney, Agent, or Firm—Steinberg & Raskin, P.C.

(57) ABSTRACT

An arrangement of equipment in connection with a variable crown roll provided with loading shoes to prevent foaming of fluid. The arrangement includes a separate guide and a face that guides the fluid in order to guide the fluid smoothly away from the inner face of the roll mantle of the roll and into a collecting trough.

20 Claims, 5 Drawing Sheets

ARRANGEMENT IN A VARIABLE-CROWN ROLL PROVIDED WITH LOADING SHOES

FIELD OF THE INVENTION

The invention concerns an arrangement for prevention of foaming of fluid in a variable-crown roll provided with loading shoes.

BACKGROUND OF THE INVENTION

Variable-crown rolls comprise a stationary axle inside the roll, on which axle the roll mantle is fitted to revolve. The roll mantle is supported in the press direction on the axle of the roll by means of loading shoes acting upon the inner face of the roll mantle, which shoes are pressed against the inner face of the roll mantle by means of the pressure of a fluid.

In paper machines, rolls which form a dewatering press nip are used commonly. It is important that the distribution of the linear load, i.e. the profile, in the axial direction of the rolls can be made invariable and that the profile can be regulated in the desired way, for example, in view of controlling the cross-direction moisture profile and/or thickness profile of the web. Also in supercalenders, the aim is to be able to regulate the calendering nip in the axial direction of the calender rolls so that the cross-direction thickness profile of the web becomes as desired. For this purpose, from the prior art, a number of different variable-crown or adjustable-crown rolls are known, at which attempts are made to act upon the distribution of the linear load in the nip.

In the rolls mentioned above, it has been noticed that foaming of the fluid is a drawback. The rolls comprise a central stationary axle, in which the loading shoes have been fitted, and the loading shoes project from the axle so that their loading members reach contact with the inner face of the roll mantle. When fluid is sprayed onto the inner face of the roll mantle for the purpose of cooling, or when fluid enters onto the inner face of the roll mantle through lubrication of the loading shoes, the fluid strikes against said loading shoe constructions, in which connection the fluid is atomized and is then readily mixed with air. Great changes in the direction of the fluid cause so-called whipping, which further affects the fluid detrimentally and foams it, in which case the fluid must already be replaced after a short period of use. The operation of the hydraulic components of the system is disturbed and their service life becomes shorter.

OBJECTS AND SUMMARY OF THE INVENTION

In the present application, a novel arrangement is suggested for elimination of the drawback mentioned above. In an embodiment of the application, it is suggested that a separate fluid guide is employed, which is fitted to be attached to the displaceable loading shoe by means of an arm. By means of a spring, the guide is pressed into contact with the inner face of the roll mantle. The guide comprises a gently curved face, by whose means the fluid is guided to fall back into a fluid collecting trough before it meets the side face of the loading shoe. Since the guide is attached to the displaceable loading shoe, the guide always follows the shape of the roll mantle and is, thus, in contact with the inner face of the roll mantle in a controlled way irrespective of any deformations of the roll mantle.

In a second preferred embodiment of the invention, a guide is used which comprises a separate loading member, for example a piston operating with fluid pressure, at whose end the guide is fitted. In such a case, the fluid pressure is fitted to be effective at the other side of the piston, and by means of the fluid pressure the guide is kept in contact with the inner face of the roll mantle.

In a third embodiment of the invention, the guide is provided with a through opening, in which connection, by means of a curved face of the guide, the fluid is guided from the inner face of the roll into the through opening and further to fall down into the fluid collecting trough. Also in this embodiment, a separate actuator acts upon the guide, which actuator can be a hydraulic piston actuator, or it can also be a spring actuator, by whose means the guide is kept in contact with the inner face of the roll mantle in connection with any deformations of the roll mantle. Through the through opening in the guide, the doctored fluid can flow through the guide and fall into the fluid collecting trough by the effect of gravity. The embodiment is in particular suitable for press constructions in which the loading shoes are in a lower position.

The invention is characterized in what is stated in the patent claims.

The invention will be described in the following with reference to some preferred embodiments of the invention illustrated in the figures in the accompanying drawings, the invention being, yet, not supposed to be confined to said embodiments alone.

DETAILED DESCRIPTION OF THE INVENTION

Figure 1:
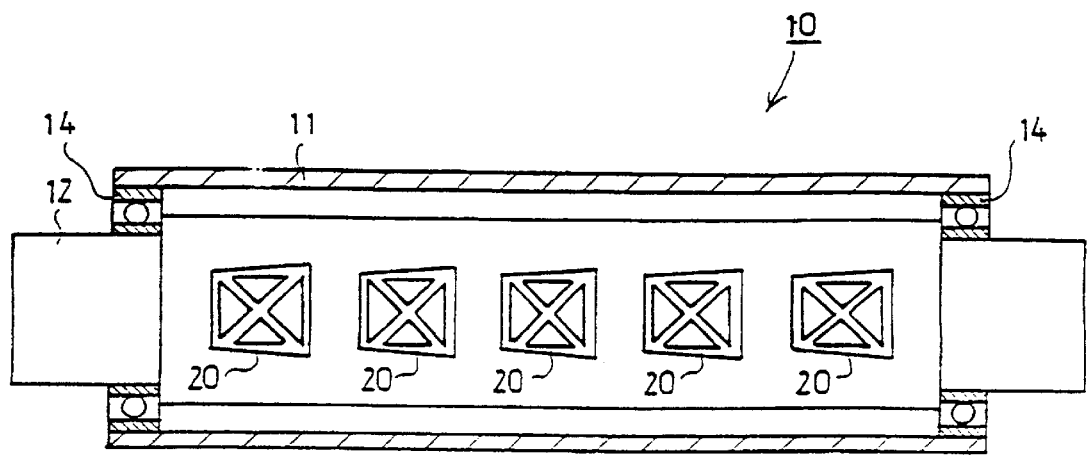
FIG. 1 shows a prior-art solution, in which the fluid is guided to flow towards the side by means of an inclined face structure of the shoes.

FIG. 1 shows a prior-art solution for prevention of foaming of fluid. In an earlier solution of the applicant, the side faces of the loading shoes 20 have been made inclined so that the fluid can flow towards the sides and further through the gaps between the loading shoes. In the solution, the roll 10 comprises a stationary axle 12, from which the loading shoes 20 project. The roll mantle 11 is fitted to revolve on support of bearing means 14.

Figure 2:
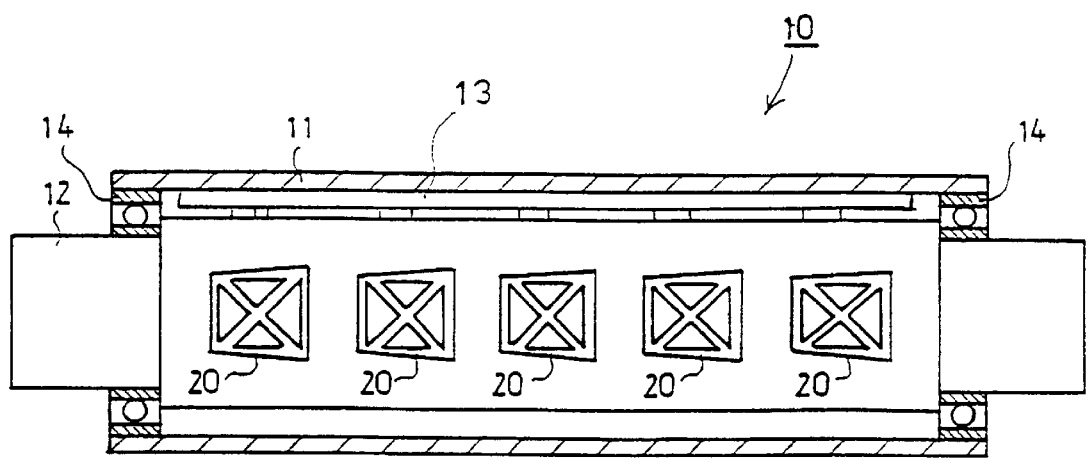
FIG. 2 shows a solution in accordance with the present invention, in which striking of the fluid applied to the inner face of the roll mantle against the inner face of the loading shoe is prevented so that the stationary central axle of the roll is provided with a separate fluid guide which extends substantially over the entire length of the roll.

FIG. 2 shows a solution in accordance with the invention, in which, before the loading shoes 20, a fluid guide 13 has been fitted in connection with the inner face of the roll mantle 11, which guide 13 extends over the entire length of the roll and by means of which guide the fluid is guided to fall directly into the fluid collecting trough. The guide 13 does not have to be made of one piece, but it may consist of a number of parts or pieces.

Figure 3B:
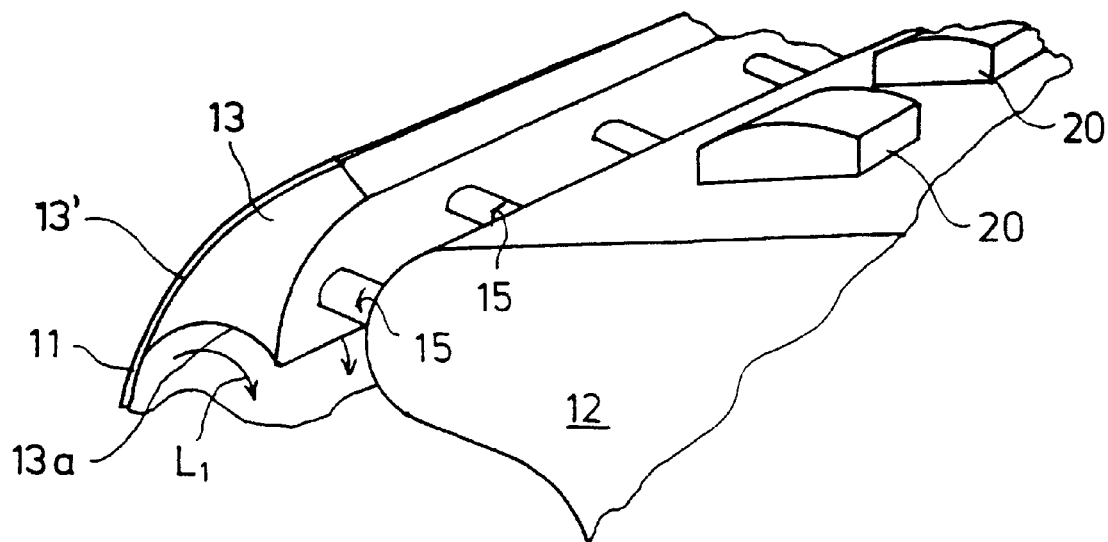
FIG. 3B is an axonometric illustration in part of the construction shown in FIGS. 2 and 3A.
Figure 3C:
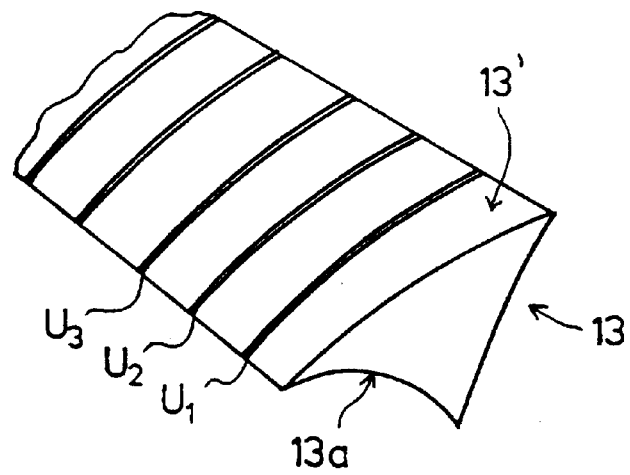
FIG. 3C is an axonometric illustration in part of an embodiment of the construction of a guide.
Figure 3A:
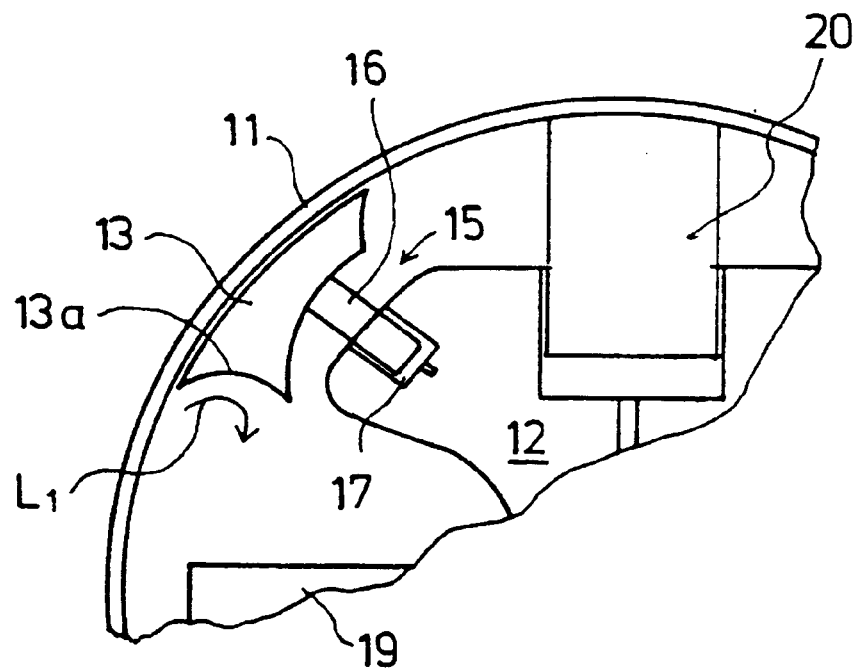
FIG. 3A is a side view of the construction shown in FIG. 2.

FIG. 3A is a side view of the solution shown in FIG. 2. The guide 13 comprises loading means 15, by which the guide 13 is supported on the central axle 12 and by whose means the guide 13 is further pressed against the inner face of the roll mantle. The loading means 15 comprise a piston part 16 and a fluid space 17 placed in the stationary axle, into which fluid space the pressurized fluid is introduced, in which connection the fluid acts upon the piston 16. Then, by means of the fluid pressure, the guide 13 is pressed against the inner face of the roll mantle. As is shown in the figure, the cross-sectional shape of the guide 13 is a construction that includes a curved guide face 13a, by means of which guide face, in the way shown in the figure, the fluid is made to flow smoothly away from the connection with the roll mantle and fitted to fall into the fluid collecting trough 19. In the figures, the guiding of the fluid by means of the guide 13 is denoted with the arrows $L_1$. The sense of rotation of the roll mantle is denoted with the arrow $S_1$.

FIG. 3B is an axonometric view of the construction shown in FIG. 3A. The guide is connected with a number of loading members 15 over its length, which members are piston devices in the embodiment shown in the figure. The guide may also be composed of separate parts or pieces, so that at least two pistons or springs act upon each piece.

FIG. 3C illustrates an embodiment of the guide 13. As is shown in the figure, the face 13' of the guide that is placed against the roll mantle may be provided with grooves $U_1, U_2 \ldots$ or with other ducts, by whose means the flow of a certain amount of fluid further is permitted, for example, for purposes of cooling. The face 13' may also be roughened in such a way that a small amount of fluid can flow through the guide.

Figure 4:
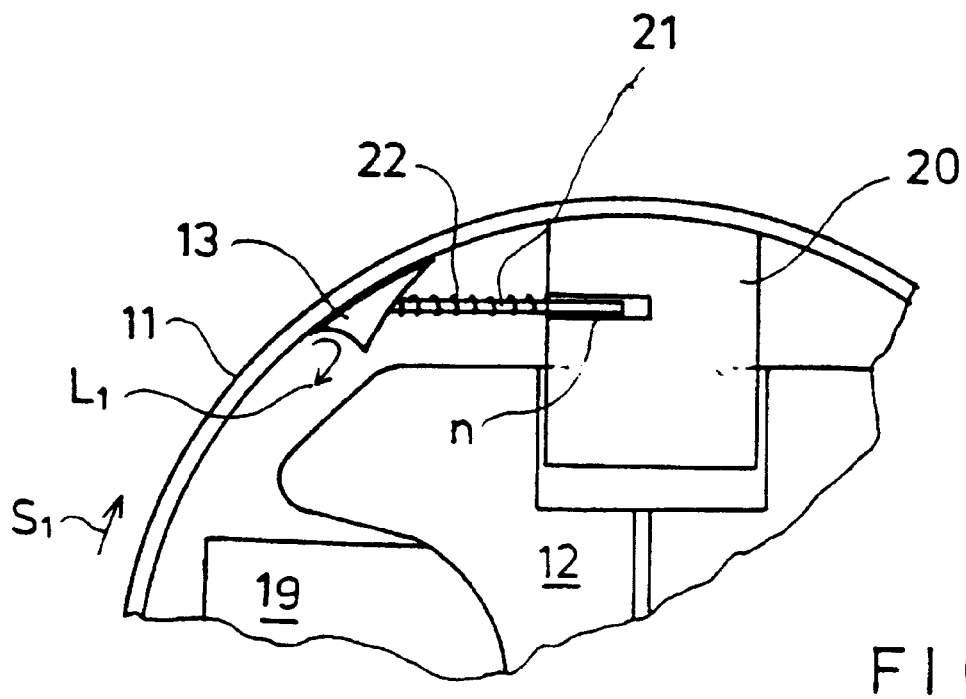
FIG. 4 shows an embodiment of the invention in which the guide is connected with the displaceable loading shoe by means of an arm and a spring.

FIG. 4 shows a second embodiment of the invention, in which the guide 13 is connected with the displaceable shoe portion 20a of the loading shoe 20 by means of a spindle 21 and a spring 22. In such a case, the guide 13 always follows the movement of the loading shoe 20a and is, thus, in contact with the inner face of the roll mantle while complying with all deformations of the roll mantle produced by the loading shoe/shoes. By means of the spring 22, the guide 13 is pressed into contact with the inner face of the roll mantle. The spring is compressed between the stationary axle 12 and the guide 13. The spiral spring 22 is fitted around the spindle 21. The spindle 21 is fitted with a glide fitting in the hole n in the side face of the loading shoe 20, so that it can be displaced in a way similar to a slide.

Figure 5A:
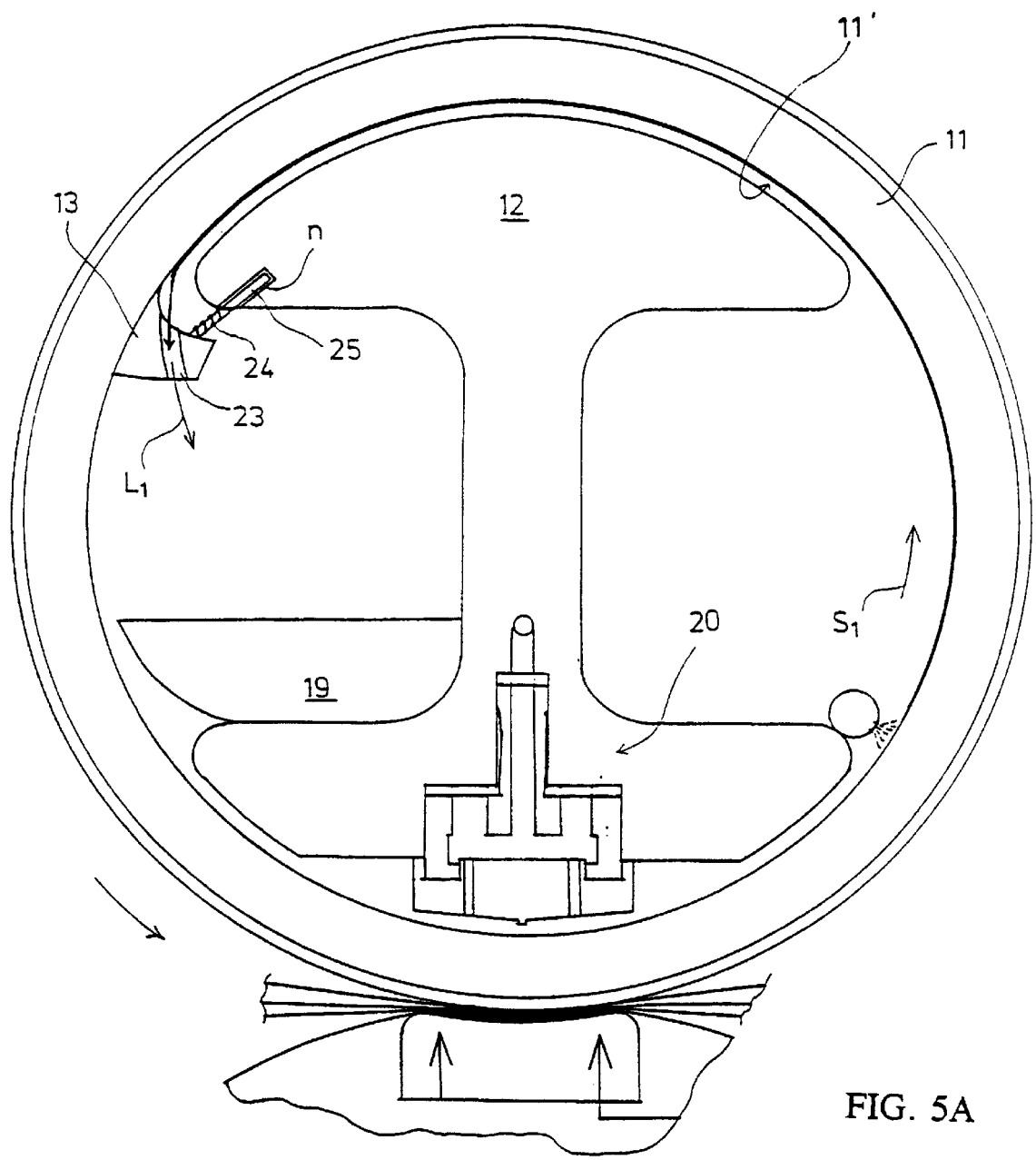
FIG. 5A shows an embodiment of the invention in which the press nip is placed at the bottom in the roll and in which the guide is fitted, by means of a spring member and a shaft, in connection with the stationary axle so that, by means of the spring member, the guide is pressed into contact with the inner face of the roll mantle, which guide comprises, in this embodiment of the invention, a flow opening passing through the guide so as to pass the fluid into the fluid collecting trough placed underneath.

FIG. 5A shows an embodiment of the invention in which the loading shoes are placed in the lower position. In the embodiment of the invention, the guide 13 includes a central flow opening 23, which permits falling of the fluid, after separation of the fluid, through the guide into the collecting trough 19 placed underneath. In this embodiment, the guide is pressed with spring force by means of the spring 24 against the inner face of the roll mantle, while the guide 13 is attached to the stationary axle 12 by means of the spindle 25 and while the spring 24 is fitted around the spindle 25 between the stationary axle 12 and the guide 13. The spindle 25 is fitted in the hole (n) in the axle 12 by means of a glide fitting, in which connection the spindle 25 receives its control and can be displaced into different positions in compliance with any deformations of the roll mantle.

Figure 5B:
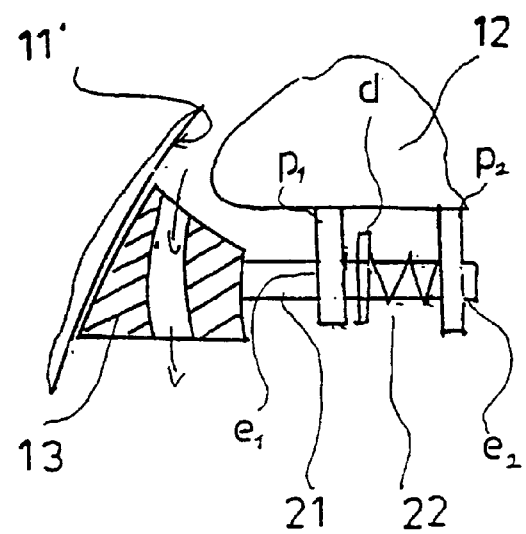
FIG. 5B shows a second mode of suspension of the guide shown in FIG. 5A.

FIG. 5B shows a second mode of suspension of the guide 13 shown in FIG. 5A. The guide 13 is suspended on the axle 12 so that the guide 13 is connected with a spindle 21, which is guided in through openings $e_1$ and $e_2$ in the suspension brackets $p_1$ and $p_2$. The spindle 21 is connected with a flange plate d, and the spring 22 is fitted as compressed between the bracket $p_2$ and the flange plate d around the spindle 21. Thus, the spring 22 presses the flange d, which, being fixed to the spindle 21, further presses the spindle 21 and the connected guide 13 towards the inner mantle 11' of the roll 11.

Figure 5C:
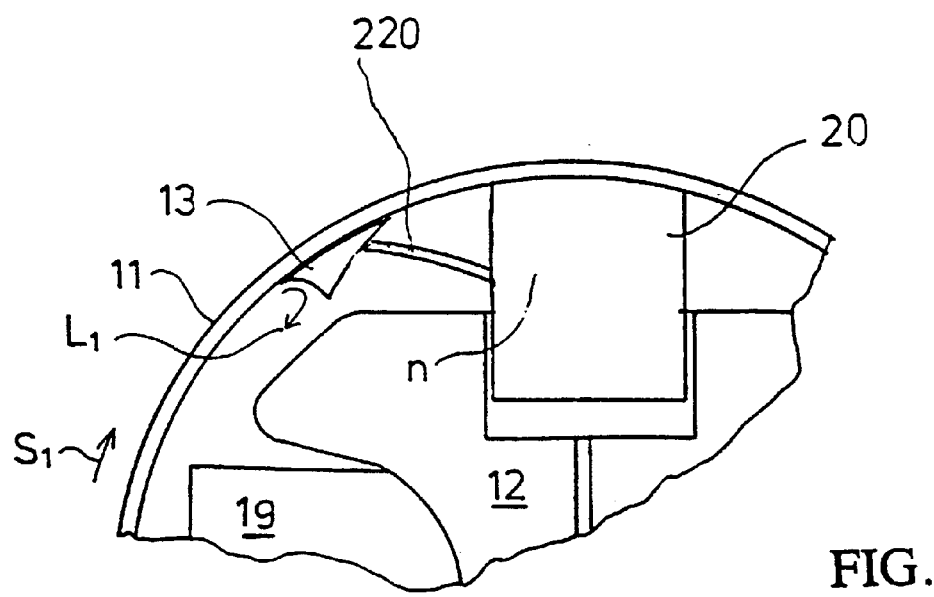
FIG. 5C shows the fastening of the guide shown in FIG. 4 by means of a leaf spring to the piston.

FIG. 5C shows a second mode of suspension of the guide 13 as shown in FIG. 4 on the piston 20. In the embodiment of FIG. 5C, the guide 13 has been suspended by means of a leaf spring 220. The leaf spring 220 is a resilient, flexible construction element, which is fixed both to the piston 20 and to the guide 13, and by its means the guide 13 is pressed against the inner face 11' of the roll mantle. A similar mode of suspension can also be applied to the guide 13 shown in FIGS. 5A and 5B.

What is claimed is:

1. An arrangement of equipment in connection with a variable-crown roll provided with loading shoes for the prevention of foaming of fluid, characterized in that the arrangement of equipment comprises a separate guide (13) and therein a face (13a) that guides the fluid smoothly away from the inner face (11') of the roll mantle (11) and into a collecting trough (19), in which arrangement of equipment the guide (13) has been fitted separate from the loading shoes (20).

2. An arrangement of equipment as claimed in claim 1, characterized in that the guide (13) comprises a curved face (13a), by whose means the fluid is guided smoothly apart from the inner face of the roll mantle to fall further into the fluid collecting trough (19), and that the guide (13) extends substantially over the entire length of the roll (11) and consists of one or several separate parts.

3. An arrangement of equipment as claimed in claim 1, characterized in that, between the guide (13) and the stationary axle (12), there is a separate actuator (15;22;220).

4. An arrangement of equipment as claimed in the preceding claim, characterized in that the stationary axle (12) includes a piston device (16,17), by whose means the guide (13) is pressed into contact with the inner face (11') of the roll mantle.

5. An arrangement of equipment as claimed in the preceding claim, characterized in that the fluid space (17) of the piston device has been formed into the stationary axle (12), and the piston (16) has been fitted into said fluid space (17), and further the piston (16) is coupled with the guide (13).

6. An arrangement of equipment as claimed in claim 1, characterized in that there is a separate spring (22;220), by whose means the guide (13) is pressed into contact with the inner face (11') of the roll mantle.

7. An arrangement of equipment as claimed in the preceding claim, characterized in that the spring (22,24) has been fitted around the spindle (21,25), which spindle (21,25) is fitted by means of a glide fitting in the hole (n) in the stationary axle (12) or in the loading shoe (20), in which connection the spindle (21,25) can be displaced in a way similar to a slide, and in which connection the spring (22,24), when it acts between the guide (13) and the stationary axle (12) or between the guide (13) and the loading shoe (20), presses the guide (13) into contact with the inner face (11') of the roll mantle.

8. An arrangement of equipment as claimed in the preceding claim, characterized in that the spindle (21) has been fitted in connection with the side face of the displaceable loading shoe (20), in which connection the guide (13) coupled with the spindle (21) always follows the deformations of the roll mantle produced by the loading shoe (20).

9. An arrangement of equipment as claimed in claim 1, characterized in that the guide (13) includes a through opening (23), in which case the guide (13) can also be fitted in such press positions in which the loading shoes (20) in the roll (11) are placed in a lower position, and in which case, by means of the guide (13), the fluid is first guided apart from the inner face (11') of the roll mantle and further, through the opening (23) passing through the guide, to fall by the effect of gravity into the collecting trough (19) placed underneath.

10. An arrangement of equipment as claimed in claim 1, characterized in that the guide (13) is a rib-like part which doctors the fluid and which has been fitted substantially over the entire length of the roll, and that there are several loading means acting upon the guide, such as springs (22) or pistons (16), fitted across the length of the roll (11).

11. An arrangement in a variable-crown roll having loading shoes, a stationary axle from which the loading shoes project and bearing means supporting the roll from an inner face of a roll mantle, the arrangement comprising:

a fluid guide structured and arranged in connection with the inner face of the roll mantle, said fluid guide having a face portion thereon, a trough located substantially beneath said fluid guide, said face portion of said fluid guide structured and arranged to guide a fluid away from the inner face of the roll mantle and into said trough.

12. The arrangement according to claim 11 wherein said guide extends substantially over the entire length of the roll and wherein said face of said fluid guide is curved.

13. The arrangement according to claim 11 further comprising loading means for pressing said fluid guide against the inner face of the roll mantle.

14. The arrangement according to claim 11, wherein said fluid guide is supported by the stationary axle.

15. The arrangement according to claim 13, wherein said loading means comprise
a piston device having a fluid space and a piston part, said fluid space located within the stationary axle and said piston part coupled to said fluid guide wherein said fluid guide is pressed against the inner face of the roll mantle upon the introduction of a pressurized fluid into said fluid space.

16. The arrangement according to claim 13, wherein said loading means comprise a spindle and a spring fitted thereon, said spindle coupled to said fluid guide.

17. The arrangement according to claim 16, wherein said spindle is coupled to the stationary axle.

18. The arrangement according to claim 16, wherein said spindle is coupled to the loading shoe.

19. The arrangement according to claim 18, wherein said spindle is structured and arranged in connection with the loading shoe and said fluid guide wherein said fluid guide substantially follows deformations in the roll mantle produced by the loading shoe.

20. The arrangement according to claim 11, wherein said fluid guide further comprises a central flow opening wherein the fluid is first guided apart from the inner face of the roll mantle and through the central flow opening passing through said fluid guide and directly into said trough.

* * * * *